United States Patent
Lai et al.

(10) Patent No.: US 9,563,837 B1
(45) Date of Patent: Feb. 7, 2017

(54) HYBRID TAG AND METHOD OF MAKING ANTENNA THEREOF

(71) Applicant: BGT MATERIALS LIMITED, Manchester (GB)

(72) Inventors: Chung-Ping Lai, Hsinchu County (TW); Jia-Cing Chen, Tainan (TW); Kuo-Hsin Chang, Chiayi County (TW)

(73) Assignee: BGT MATERIALS LIMITED, Manchester (GB)

( * ) Notice: Subject to any disclaimer, the term of this patent is extended or adjusted under 35 U.S.C. 154(b) by 0 days.

(21) Appl. No.: 15/161,618

(22) Filed: May 23, 2016

(51) Int. Cl.
| | | |
|---|---|---|
| *G06K 19/077* | (2006.01) | |
| *G06K 19/06* | (2006.01) | |
| *H01Q 1/38* | (2006.01) | |
| *H01Q 1/36* | (2006.01) | |

(52) U.S. Cl.
CPC ... *G06K 19/07773* (2013.01); *G06K 19/06187* (2013.01); *H01Q 1/364* (2013.01); *H01Q 1/38* (2013.01)

(58) Field of Classification Search
None
See application file for complete search history.

(56) References Cited

U.S. PATENT DOCUMENTS

| | | | | |
|---|---|---|---|---|
| 7,183,917 B2 * | 2/2007 | Piccoli | ............ | E05B 73/0017 340/10.1 |
| 2009/0274833 A1 * | 11/2009 | Li | ............ | B22F 1/0022 427/123 |
| 2009/0317968 A1 * | 12/2009 | Nagata | ............ | H01L 27/12 438/600 |

* cited by examiner

*Primary Examiner* — Kristy A Haupt

(57) ABSTRACT

A hybrid tag is employed to magnetic system and radio frequency system and contains: an IC chip and an antenna electrically connected with the IC chip. The IC chip includes a memory storage unit configured to store digital data, and the antenna is made of mixture composition in a printing manner, wherein the mixture composition includes electrically conductive material, magnetic material, dispersant and adhesive, and wherein the hybrid tag responds magnetic waves within low frequency (LF) range and responds radio frequency signals within high frequency (HF) range, ultra high frequency (UHF) range, and microwave range. Thereby, the hybrid tag is manufactured easily at low production cost.

4 Claims, 1 Drawing Sheet

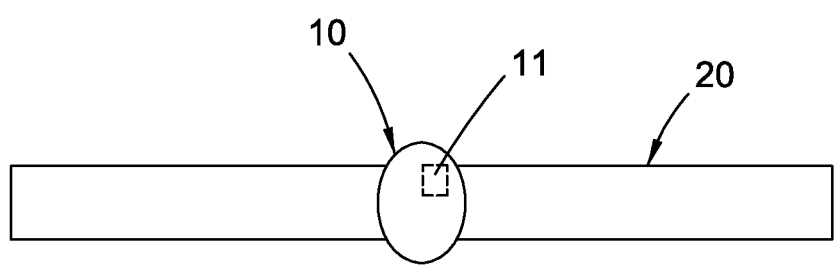

HYBRID TAG AND METHOD OF MAKING ANTENNA THEREOF

FIELD OF THE INVENTION

The present invention relates to an electronic tag, and more particular to a hybrid tag which is employed to magnetic system and radio frequency system.

BACKGROUND OF THE INVENTION

Electronic article surveillance system (EAS systems) is comprised of a detector, a deactivator, and an electric tag and is in type of magnetic system, radio frequency system (RF system), electromagnetic system, or microwave system.

The radio frequency system is configured at low cost and contains an electric tag having an antenna, and the electric tag (such as a RFID tag) is adhered on a product so as to store digital data, such as product information. Preferably, the product is detected by transmitting/receiving radio frequency signals from/to the antenna within a specific frequency range. However, other coil objects or electric products will trigger radio frequency system (RF system) because of slimier frequencies to the antenna. In addition, the electric tag of the radio frequency system cause anti-theft failure as moving close to or adhering on a metal foil, water or a human body.

A magnetic tag of a magnetic system (such as acousto magnetic system) is adhered on a product and is in type of a soft tag or a hard tag, wherein as the magnetic tag is deactivated and passes through an antenna fixed in an exit, it makes alert. But the magnetic tag cannot store data sufficiently.

An identification tag with enhanced security is disclosed in U.S. Pat. No. 6,154,137 and contains a magnetic response element and a radiofrequency response element, wherein the magnetic response element is used as an antenna of the radiofrequency response element, and the antenna is made of metal material or magnetic metal with electricity conductivity. The identification tag also contains flux collection elements, capacitance, and cell(s), thus having complicated structure and large size.

Combination radio frequency identification transponder (RFID tag) and magnetic electronic article surveillance (EAS) tag are disclosed in U.S. Pat. No. 7,00,475 B2 and contain an antenna partially or completely made of magnetic material, wherein the magnetic material is an electrical conductor in plating or coating manner, and the RFID tag and EAS tag are launched by using at least one cell.

A universal tracking assembly is taught in U.S. Pat. No. 7,859,410 B2 and contains hybrid tags, yet this tracking assembly cannot track objects by using acousto magnetic system and radio frequency identification tag simultaneously.

Hybrid acousto-magnetic radio frequency transceiver device is disclosed in US Publication No. 2007/0046470A1, wherein a RF antenna and acousto-magnetic antenna are configured separately, and another transceiver antenna is required as well.

Accordingly, above-mentioned prior arts cannot reduce a size of tags and cannot simplify complicate configuration, and the magnetic material interferes the radio frequency signals.

The tags still require other extra elements, such as flux collection elements, capacitance, and cell(s), thus having complicate configuration and large size.

The present invention has arisen to mitigate and/or obviate the afore-described disadvantages.

SUMMARY OF THE INVENTION

The primary objective of the present invention is to provide a hybrid tag which is manufactured easily at low production cost.

To obtain above-mentioned objective, a hybrid tag provided by the present invention contains: an IC chip and an antenna electrically connected with the IC chip.

The IC chip includes a memory storage unit configured to store digital data, and the antenna is made of mixture composition in a printing manner, wherein the mixture composition includes electrically conductive material, magnetic material, dispersant and adhesive, and wherein the hybrid tag responds magnetic waves within low frequency (LF) range and responds radio frequency signals within high frequency (HF) range, ultra high frequency (UHF) range, and microwave range.

Preferably, the electrically conductive material is 20 wt % to 80 wt % of the mixture composition, the magnetic material is 10 wt % to 70 wt % of the mixture composition, the dispersant is 0.01 wt % to 1.5 wt % of the mixture composition, and the adhesive is 0.1 wt % to 20 wt % of the mixture composition.

Preferably, the electrically conductive material contains at least one of iron, cobalt, nickel, aluminum, silver, copper, graphite, graphene, and carbon black or their combination; the magnetic material is amorphous alloy which contains at least two of iron, nickel, cobalt, aluminum, silicon, molybdenum, boron, and chromium or their combination; the dispersant is non-ionic dispersant which contains at least one of P-123, Tween 20, Xanthan gum, Carboxymethyl Cellulose (CMC),Triton X-100, Polyvinylpyrrolidone (PVP), and Brji 30 or their combination; and the adhesive contains at least one of Polyvinylidene fluoride (PVDF), Polyetherimide (PEI), resin, Polyvinyl alcohol (PVA), epoxy, Carboxymethyl Cellulose (CMC), Ethyl carbamate (EC), rubber, and siloxane or their combination.

Furthermore, a method of making the antenna of the hybrid tag contains comprising steps of:

A) preparing inks, wherein the electrically conductive material, the magnetic material, the dispersant and the adhesive are mixed into a carrier so as to produce the inks;

B) printing the pattern of the antenna on a substrate by using the inks;

C) solidifying the inks and adhering the electrically conductive material and the magnetic material on the pattern of the antenna evenly; and D) pressing the electrically conductive material, the magnetic material, the dispersant and the adhesive together.

Preferably, in the step D), the pattern of the antenna is printed on the substrate in any one of inkjet printing manner, screen printing manner, gravure printing manner, and typography manner Preferably, in the step of C), the inks are solidified in heat baking manner or light illuminating manner

BRIEF DESCRIPTION OF THE DRAWINGS

FIG. 1 is a diagram showing the assembly of a hybrid tag according to a preferred embodiment of the present invention.

DETAILED DESCRIPTION OF THE PREFERRED EMBODIMENTS

With reference to FIG. 1, a hybrid tag according to a preferred embodiment of the present invention comprises:

an IC chip 10 and an antenna 20 electrically connected with the IC chip 10, wherein the IC chip 10 includes a memory storage unit 11 (such as memory) configured to store digital data, such as product data.

The antenna 20 is made of mixture composition in a printing manner, and the mixture composition includes electrically conductive material, magnetic material, dispersant and adhesive, wherein the electrically conductive material and the magnetic material determine antenna's performance, wherein the hybrid tag responds magnetic waves within low frequency (LF) range and responds radio frequency signals within high frequency (HF) range, ultra high frequency (UHF) range, and microwave range. The electrically conductive material is 20 wt % to 80 wt % of the mixture composition, the magnetic material is 10 wt % to 70 wt % of the mixture composition, the dispersant is 0.01 wt % to 1.5 wt % of the mixture composition, and the adhesive is 0.1 wt % to 20 wt % of the mixture composition, such that weight percentages of the electrically conductive material, the magnetic material, the dispersant and the adhesive are adjustable so as to change hybrid tag's performance. Alternatively, pattern of the antenna 20 is variable so as to change the hybrid tag's performance.

The hybrid tag of the present invention is applicable for a magnetic system, and the frequency response of the antenna 20 is deactivated or is offset by eliminating the antenna 20 or configuring a magnetic attraction element.

Furthermore, a method of making the antenna 20 of the hybrid tag according to a preferred embodiment of the present invention comprises steps of:

A) preparing inks, wherein the electrically conductive material, the magnetic material, the dispersant and the adhesive are mixed into a carrier so as to produce the inks;

B) printing the pattern of the antenna 20 on a substrate by using the inks;

C) solidifying the inks and adhering the electrically conductive material and the magnetic material on the pattern of the antenna 20 evenly; and D) pressing the electrically conductive material, the magnetic material, the dispersant and the adhesive together.

In the step of C), the inks are solidified in heat baking manner or light illuminating manner.

The electrically conductive material contains at least one of iron, cobalt, nickel, aluminum, silver, copper, graphite, graphene, and carbon black or their combination.

The magnetic material is amorphous alloy which contains at least two of iron, nickel, cobalt, aluminum, silicon, molybdenum, boron, and chromium or their combination.

The dispersant is non-ionic dispersant which contains at least one of P-123, Tween 20, Xanthan gum, Carboxymethyl Cellulose (CMC),Triton X-100, Polyvinylpyrrolidone (PVP), and Brji 30 or their combination.

The adhesive contains at least one of Polyvinylidene fluoride (PVDF), Polyetherimide (PEI), resin, Polyvinyl alcohol (PVA), epoxy, Carboxymethyl Cellulose (CMC), Ethyl carbamate (EC), rubber, and siloxane or their combination.

In the step D), the pattern of the antenna 20 is printed on the substrate in any one of inkjet printing manner, screen printing manner, gravure printing manner, and typography manner.

Thereby, the hybrid tag only contains the IC chip 10 and the antenna 20, and the antenna 20 is made of the mixture composition including the electrically conductive material, the magnetic material, the dispersant and the adhesive, thus manufacturing the hybrid and the antenna 20 easily at low production cost.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A hybrid tag being employed to magnetic system and radio frequency system and comprising:
    an IC chip and an antenna electrically connected with the IC chip;
    wherein the IC chip includes a memory storage unit configured to store digital data;
    wherein the antenna is made of mixture composition in a printing manner, and the mixture composition includes electrically conductive material for electromagnetic signals, magnetic material for magnetic signals, dispersant and adhesive, wherein the hybrid tag responds magnetic waves within low frequency (LF) range and responds radio frequency signals within high frequency (HF) range, ultra high frequency (UHF) range, and microwave range.

2. The hybrid tag as claimed in claim 1, wherein the mixture composition of printing ink includes electrically conductive materials, magnetic materials, dispersant, and adhesive.

3. A method of making the antenna of the hybrid tag as claimed in claim 1
    is a printing process with post-compression and post-magnetization procedures; pressing a printed antenna layer on a substrate is used to further enhance its adhesion and performance; and post-magnetization treatment is used to activate magnetic property of the printed antenna layer.

4. The method of making the antenna of the hybrid as claimed in claim 3, wherein a compression ratio of the printed antenna layer is 20% to 90% of an original thickness of the printed antenna layer.

* * * * *